Patented Aug. 9, 1927.

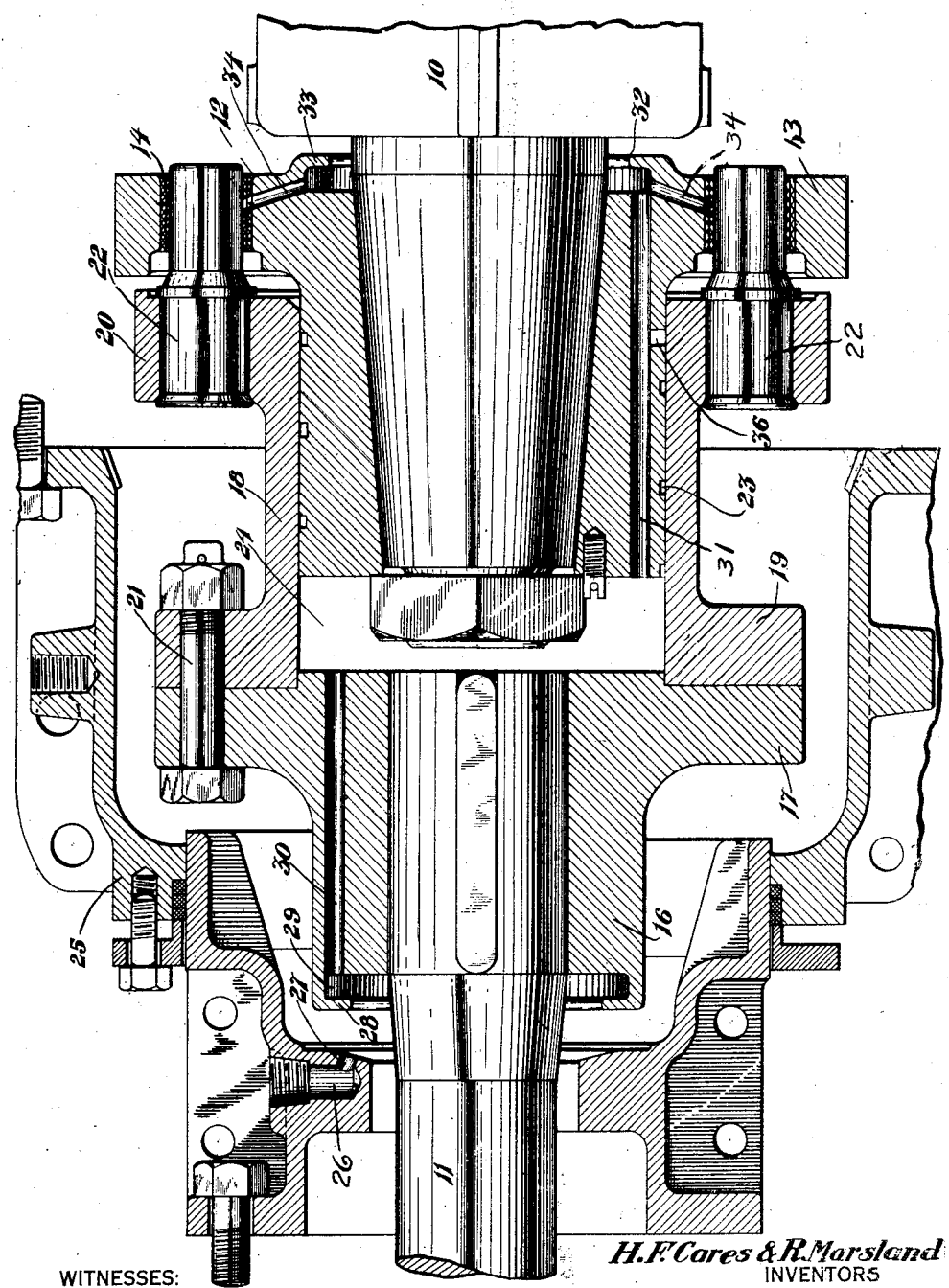

1,638,796

UNITED STATES PATENT OFFICE.

HARRY F. CARES AND ROLAND MARSLAND, OF ESSINGTON, PENNSYLVANIA, ASSIGNORS TO WESTINGHOUSE ELECTRIC & MANUFACTURING COMPANY, A CORPORATION OF PENNSYLVANIA.

SHAFT COUPLING.

Application filed November 23, 1921. Serial No. 517,275.

This invention relates to shaft couplings and more particularly to rotary couplings of the expansion type wherein free axial movement of the shaft sections is permitted, and it has for an object the provision of apparatus of the character designated which shall effect adequate lubrication of the coupling elements in a simple and efficient manner, while maintaining a compact, accessible and efficient coupling structure.

In the accompanying drawing, the single figure is a longitudinal section through a device embodying our invention.

In the operation of expansion couplings, it is essential that the element which transmits the torque of the driving shaft to the driven shaft be effectively lubricated to avoid the large power losses and the rapid deterioration incident to the excessive friction resulting from insufficient lubrication. It is also desirable to effect lubrication of the coacting surfaces of the members having a relative sliding movement by means of which compensation for varying shaft length is effected, in order to obviate the difficulty of sticking or rusting together of these surfaces. Superior and more effective lubrication is obtained by the use of fluid lubricant, such as oil, rather than with heavy greases, but the use of such fluid lubricant is attended with mechanical difficulties, such as proper distribution to the rapidly rotating surfaces to be lubricated.

With the above and other objects in view, we have devised a coupling structure in which fluid lubricant is introduced into a chamber formed between the coupling members, and is thence distributed to the various points to be lubricated. Other structural features of our invention will be apparent from the subjoined description.

Referring to the drawings for a more detailed understanding of our invention, we show at 10 a driving shaft adapted to rotate a driven shaft 11. The driving shaft 10 is rigidly secured by any well known means to a driving member 12, which consists of a cylindrical body portion having an integrally formed circumferential flange 13, provided with a series of spaced holes 14, bushed in any suitable manner. The driven shaft 11 is similarly secured to a driven member 16, having an integral, circumferential flange 17, the driven member 16 being similar in general form to the driving member 12. Rigidly secured to the driven member 16 and in axial alignment therewith is a sleeve member 18 which consists of a hollow cylindrical portion having the projecting flanges 19 and 20. The flange 19 is rigidly bolted to the flange 17 of the driven member 16 by means of bolts 21. The flange 20 carries a series of suitably secured driving pins 22, the projecting ends of which are adapted to operatively engage the bushed holes 14 in the flange 13 of the driving member 12, thus constituting a torque-transmitting connection between the driving and driven members.

The hollow sleeve member 18 partially embraces the body portion of the driving member 12 in such a manner as to permit of a limited axial movement between them, as is well understood in the art to which our invention relates. Relative axial movement between the flanges 13 and 20 is permitted by corresponding travel of the pins 22 in the bushed holes 14. The outer surface of the cylindrical driving member 12 is provided with a spiral groove 23, by means of which lubricant is introduced between the coacting surfaces of the member 12 of the sleeve 18 in a manner hereinafter described.

The ends of the members 12 and 17, and the inner wall of the sleeve member 18 define a chamber 24, adapted to act as a reservoir for the lubricant supplied to the coupling. Lubricant for this purpose is conducted under pressure from any suitable source to an inlet passage 26 in a coupling housing 25. The passage 26 is provided with a port or nozzle 27 communicating with its lower end. On the end of the member 16 adjacent the port 27 is formed an overhanging, dependent flange 28, which defines, with the member 16, an annular trough 29, adapted to receive lubricant from the jet of lubricant passing through the nozzle 27. The lubricant so received is retained in the trough 29 by virtue of the centrifugal force to which it is subjected in consequence of the rotation of the member 16. The member 16 is also provided with a longitudinal duct 30, communicating with the trough 29 and with the chamber 24. The centrifugal force of rotation of the member 16, acting on the lubricant in the trough 29, causes it to flow through the duct 30 into the chamber 24. From the chamber 24 a portion of the lubricant passes, by means of the spiral groove 23, between the coacting surfaces of the member 12 and the sleeve 18.

Lubricant also flows through a longitudinal duct 31 in the driving member 12 from the chamber 24 to an annular trough 32, formed on the outer end of the driving member 12 by an overhanging, dependent flange 33, similar to the flange 28 on the driven member 16. The duct 31 may be tapped near the middle of its length by a branch duct 36, by means of which additional lubricant is supplied to the coacting surfaces of the member 12 and the sleeve 18, supplementing the lubrication of these surfaces by the spiral groove 23. The driving member 12 is provided with a number of radial passages or ports 34, corresponding in number to the driving pins 22 which connect the trough 32 with the bearing surfaces 14, which coact with the pins 22. By reason of the centrifugal force acting on the lubricant in the trough 32, lubricant is forced through the ports 34 to the driving pins 22.

The operation of our device, as has been indicated in the foregoing description, is as follows. Lubricant under pressure is supplied to the inlet passage 26 in the coupling housing 25, and passes through the nozzle 27 in a jet, directed at such an angle as to strike the shaft 11 at a point close to the end of the driven member 16. From this point the lubricant spreads out and is caught by the annular trough 29, in which it is retained by the centrifugal force of rotation, and from which it is fed through the duct 30 to the chamber 24. From the chamber 24, a portion of the lubricant is fed through the spiral groove 23 between the coacting surfaces of the sleeve member 18 and the driving member 12, lubricating these surfaces with respect to their relative sliding movement.

The remainder of the lubricant is fed by reason of centrifugal force, through the longitudinal duct 31 to the annular trough 32 on the driving member 12, thence by way of the radial passages 34 to the coacting surfaces of the pins 22 and the bushed holes 14 in the flange 13.

While we have shown our invention in but one form, it will be obvious to those skilled in the art that it is not so limited, but is susceptible of various other changes and modifications, without departing from the spirit thereof, and we desire, therefore, that only such limitations shall be placed thereupon as are imposed by the prior art or as are specifically set forth in the appended claims.

What we claim is:—

1. In a shaft coupling of the expansion type, in combination, a first coupling member, a second coupling member having a sleeve adapted to engage the first coupling member in axially sliding relation and defining a chamber therewith, torque-transmitting means connecting the first coupling member and the sleeve, centrifugal means including longitudinal ducts whereby lubricant is supplied to the chamber through the second coupling member, means including a spiral groove whereby lubricant is fed between the sleeve and the first coupling member from the chamber, and means including a longitudinal duct through the first coupling member whereby lubricant is fed from the chamber to the torque-transmitting means.

2. In a rotary shaft coupling of the axial-expansion type, in combination, a first coupling member, a second coupling member having a sleeve engaging the first coupling member in axially sliding relation and defining a chamber therewith, torque-transmitting means connecting the first coupling member and the sleeve, centrifugal means including a longitudinal duct in the second coupling member for supplying lubricant to the chamber, and means including a longitudinal duct through the first coupling member for supplying lubricant from the chamber to the torque-transmitting means.

3. In a shaft coupling of the axial-expansion type, a first coupling member, a second coupling member having a sleeve engaging the first coupling member in axially sliding relation and defining a chamber therewith, torque-transmitting means connecting the first coupling member and the sleeve, a housing surrounding the second coupling member and provided with a lubricant admission port, means associated with the second coupling member for receiving the lubricant from the port and conducting it to the chamber and means for effecting the distribution of the lubricant from the chamber to the slidably engaging surface of the first coupling member and the sleeve.

4. In a shaft coupling of the axial-expansion type, a first coupling member, a second coupling member engaging the first coupling member and forming a chamber therewith, centrifugal means associated with the second coupling member for receiving and propelling lubricant, a longitudinal duct in the second coupling member for conveying lubricant from the centrifugal propelling means into the chamber, and centrifugal distributing means associated with the first coupling member for distributing lubricant from the chamber to a plurality of points along the slidably engaging surfaces of the first coupling and the second coupling members.

In testimony whereof, we have hereunto subscribed our names this 15th day of November, 1921.

HARRY F. CARES.
ROLAND MARSLAND.